United States Patent [19]
Mori

[11] Patent Number: 5,978,075
[45] Date of Patent: Nov. 2, 1999

[54] DISTANCE CORRECTION METHOD AND THE CONTROLLER FOR THE REFLECTOMETER

[75] Inventor: Tohru Mori, Tokyo, Japan

[73] Assignee: Ando Electric Co., Ltd., Tokyo, Japan

[21] Appl. No.: 09/086,506

[22] Filed: May 28, 1998

[30] Foreign Application Priority Data

May 30, 1997 [JP] Japan ................................. 9-142766

[51] Int. Cl.$^6$ .................................................. G01N 21/00

[52] U.S. Cl. ............................................ 356/73.1; 385/100

[58] Field of Search ........................... 356/73.1; 385/123, 385/100, 12

[56] References Cited

U.S. PATENT DOCUMENTS 5,592,577   1/1997   Tanoue ................................. 356/73.1

*Primary Examiner*—Frank G. Font
*Assistant Examiner*—Tu T. Nguyen
*Attorney, Agent, or Firm*—Fish & Richardson P.C.

[57] ABSTRACT

A distance correction method and the controller for a reflectometer is disclosed which is able to perform accurate correction of the distances measured by reflectometer. In the distance correction method for the reflectometer which measures the Fresnel reflection or Raleigh back-scattering light of an optical fiber or an optical waveguide, the distance correction $D_{wg1}$–$D_{wgn}$ is performed according to the respective group refraction ratios which are the parameters of the optical fiber or the optical waveguides longitudinally connected with having different known group refraction ratios.

4 Claims, 2 Drawing Sheets

STARTING POINT OF MEASUREMENT

DISTANCE CORRECTION METHOD AND THE CONTROLLER FOR THE REFLECTOMETER

BACKGROUND OF THE INVENTION

1. Field of the Invention

The present invention relates to a distance correction method and the controller for the reflectometer which measures the Fresnel reflection and Rayleigh back-scattering light of an optical fiber or an optical waveguide.

This application is based on patent application No. Hei 09-142766 filed in Japan, the content of which is incorporated herein by reference.

2. Description of the Related Art

A conventional light signal propagating apparatus utilizing the difference in the specific refraction ratio, for example, an optical fiber or quartz optical waveguide, requires its resulting distance to be corrected with the formula (1):

$$D_{wg} = D_v/n \tag{1}$$

when measuring the Fresnel reflection or Rayleigh back-scattering light by reflectometer because the propagation speed of the light signal in the above apparatus is slower than in a vacuum or in air. Here, $D_{wg}$ is a length of the light signal propagating apparatus to be tested, $D_v$ is a distance measured by the reflectometer, and n is a group refraction ratio of the above light signal propagating apparatus.

A light transfer method with a large capacity such as the time sharing multiple light transfer method or the light wavelength multiple transfer method requires the dispersion compensation management with a dispersion compensator set on a dispersion compensation optical fiber or a quartz board, because transfer characteristics are considerably degraded due to dispersion by the light propagation apparatus, such as an optical fiber. Consequently, light signal propagation apparatuses which have different group refraction ratio are connected in a series.

Also, a light composite module is mostly an assembly of the components which have a different refraction ratio such as a light signal propagation apparatus, for example, an optical fiber, lens or prism. There is often air between those above components.

There is a problem in the conventional distance correction method using reflectometer, in which the above components or light signal propagation apparatuses with different refraction ratios are connected in series, making accurate correction difficult because the correction is performed as a whole.

SUMMARY OF THE INVENTION

It is therefore an object of the present invention to provide a distance correction method and the controller for the reflectometer which enables the accurate correction of the measured distance.

In order to attain this object, the present invention provides distance correction method for the reflectometer which measures Fresnel reflection or Raleigh back-scattering light of the optical fiber or the optical waveguide, wherein distance correction according to each of the different group refraction ratios is performed for each of the optical fibers or optical waveguides which are connected longitudinally and having known group refraction ratios.

The present invention further provides a controller for the reflectometer which measures Fresnel reflection or Raleigh back-scattering light of the optical fiber or the optical waveguide comprising a control means to perform the distance correction according to the respective group refraction ratio of each of the periods of the optical fibers or the optical waveguides which are connected longitudinally and have known group refraction ratios.

With distance correction method and the controller for the reflectometer of the present invention, accurate correction of the position is possible, and contributes to the accurate detection of the position, such as Fresnel reflection position, when measuring Fresnel reflection or Raleigh back-scattering light in the light signal propagation means, such as optical fibers or quarts optical waveguides which are connected in series with different group refraction ratios in the direction of the light signal propagation. It is because the distance correction is performed for each length of the optical fibers and of the quartz optical waveguides.

Also, efficiency of the operation can be improved if the distance correction is performed only for a specified area, because extra correction of the unnecessary distance is omitted.

Also, distance correction can be performed easily when automatic detection means of connecting points, contained in reflectometer, is used together.

DETAILED DESCRIPTION OF THE PREFERRED EMBODIMENTS

Figure 1:
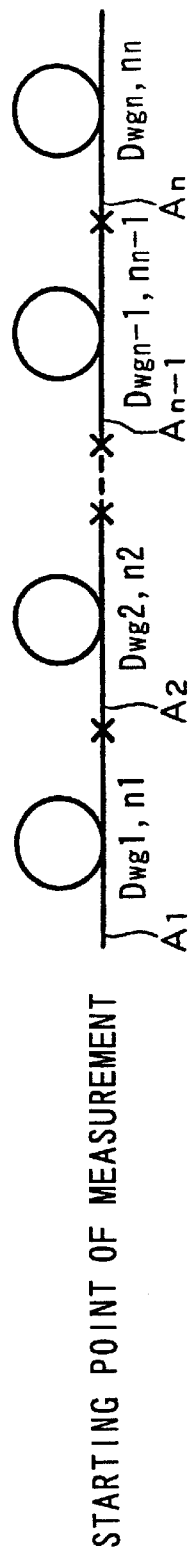
FIG. 1 is a diagram showing a construction of a light signal propagation means.

Hereinbelow, the distance correction method and the controller for the reflectometer according to an embodiment of the present invention will be described with reference to FIG. 1, which is a diagram showing a construction where light signal propagation means $A_1$–$A_n$ are connected in series. Above $A_1$–$A_n$ represent optical fibers or optical waveguides having different known group refraction ratios. Here, $n_1$–$n_n$ represent group refraction ratios, respectively, of the light signal propagation means $A_1$–$A_n$. Also, $D_{wg1}$–$D_{wgn}$ represent lengths respectively of the light signal propagation means $A_1$–$A_n$.

Figure 2:
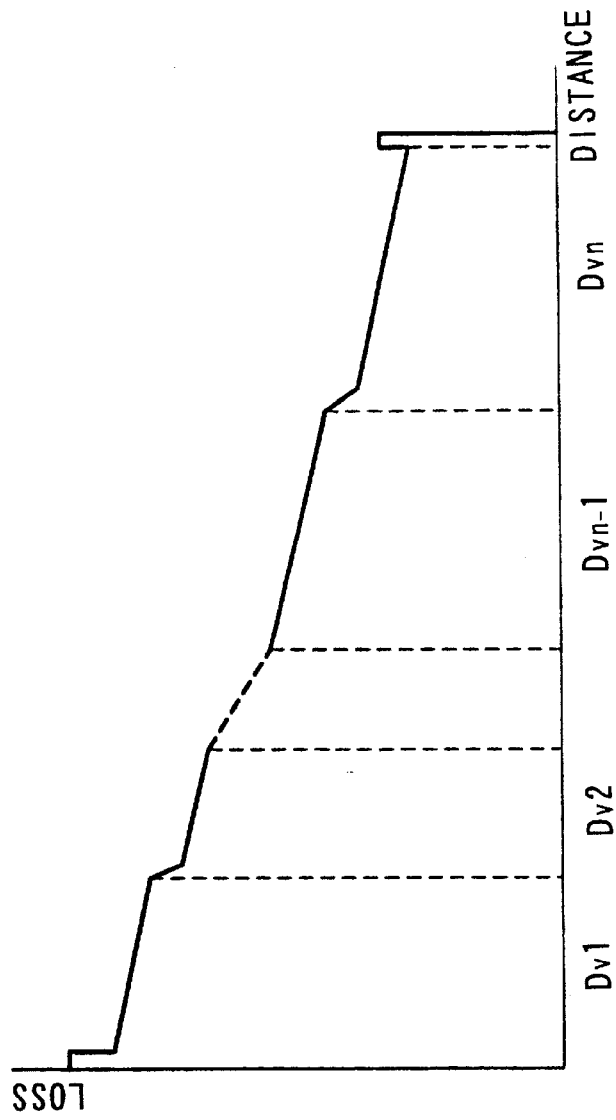
FIG. 2 is a waveform before the correction of the distance, as measured through the light signal propagation apparatus by reflectometer, is performed.
Figure 3:
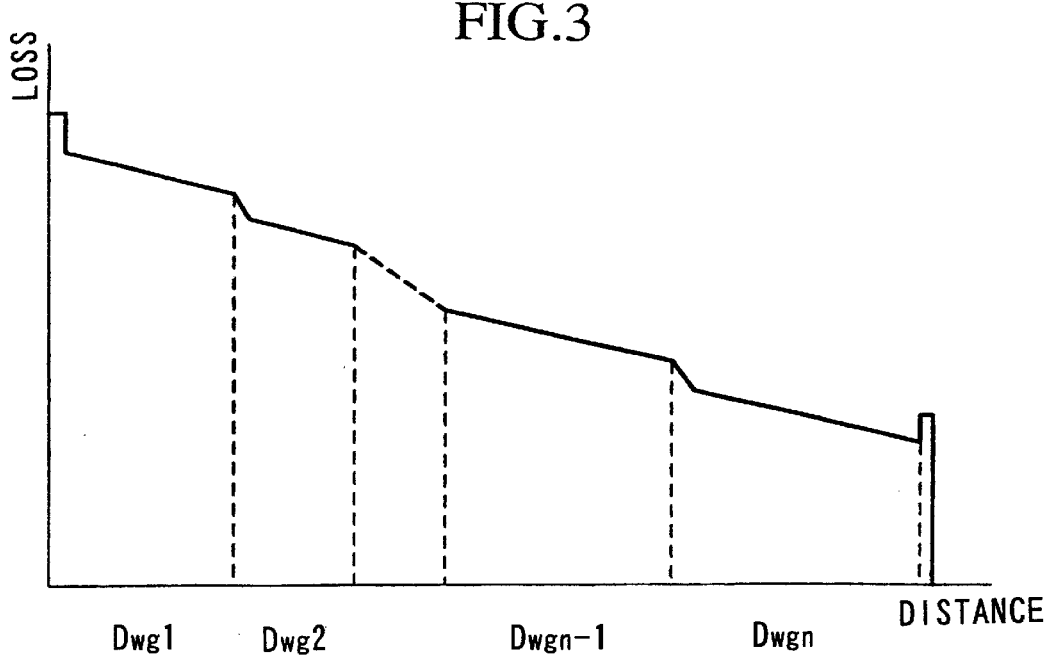
FIG. 3 is a waveform after the distance correction of the reflectmeter is performed by the present invention.

FIG. 2 is a waveform before the correction of the distance, which is measured through the light signal propagation apparatus $A_1$–$A_2$ by a reflectometer caribrated by the speed of light c in a vacuum, is performed. The optical fibers or quartz optical waveguides which comprise light signal propagation means $A_1$–$A_n$ have respectively different group refraction ratios $n_1$–$n_n$. Accordingly, distances of Fresnel reflection point or Rayleigh back-scattering light distribution which are measured by reflectometer are longer than the actual distances. The differences are caused by group refraction ratios. The following is an example of the distance correction. First, individual distances $D_{v1}$–$D_{vn}$ of the optical fibers and quartz optical waveguides are measured. Next, the distance correction is performed by dividing the above $D_{v1}$–$D_{vn}$ by respective group refraction ratios $n_1$–$n_2$.

The steps described above can be formulated as follows.

$$D_{total} = D_{wg1} + D_{wg2} + \ldots + D_{wgn-1} + D_{wgn} \quad (2)$$
$$= (D_{v1}/n_1) + (D_{v2}/n_2) + (\ldots) + (D_{vn-1}/n_{n-1}) +$$
$$(D_{vn}/n_n)$$

The distance correction of the reflectometer can be obtained by displaying each of the distances of the optical fibers and quartz optical waveguides.

Also, the distance correction can be performed for only the specified area instead of whole area. In this case, the number of terms in formula (2) varies according to the number of the optical fibers or quartz optical waveguides comprising the light signal propagation means in the specified area.

Accordingly, accurate correction of the distance is possible for only the specified area, and efficiency of the operation can be improved by omitting the operation of distance correction for the unnecessary area.

Figure 4:
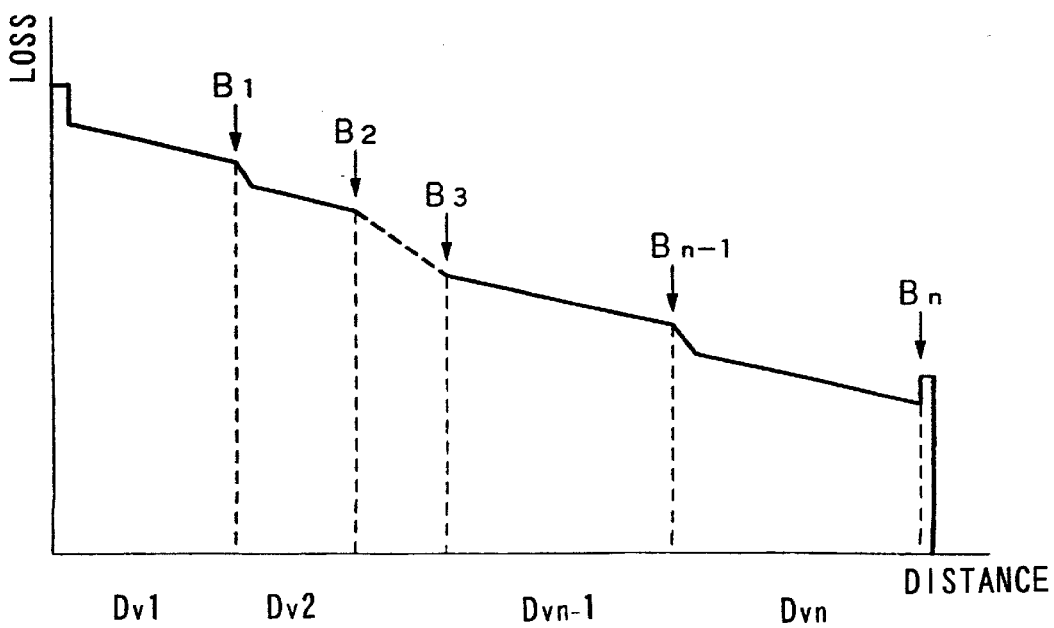
FIG. 4 is a waveform after the distance correction by the present invention is automatically performed with a function contained in the reflectometer, of automatic detection of connecting points.

Also, the automatic detecting function of the connecting points contained in the reflectometer performs an automatic recognition of the connecting points $B_1$–$B_n$ as shown in FIG. 4, and calculation of each of the distances between the connecting points. Distance correction of the reflectometer presented in formula (2) is performed based upon above results.

Further, the reflectometer contains a controller to control the operation represented in the formula (2).

What is claimed is:

1. A distance correction method for a reflectometer which measures Fresnel reflection or Raleigh back-scattering light of an optical fiber or an optical waveguide, wherein a distance correction according to each different group refraction ratio is performed for each of the optical fibers or optical waveguides which are connected longitudinally and have known group refraction ratios $n_j$ to obtain a total distance $D_{total}$, where $$D_{\text{total}} = \sum_{j=1}^{m} \left(\frac{D_j}{n_j}\right),$$

where j is an index for the optical fibers and waveguides, $D_j$ is a measured distance for the optical fiber or waveguide corresponding to the index j, and m is a positive integer.

2. A distance correction method according to claim 1, wherein the distance correction is performed for only a specified range of the optical fiber or the optical waveguides.

3. A distance correction method according to claim 1, wherein the distance correction is automatically performed with a function for automatic detection of connecting points contained in the reflectometer.

4. A controller of a reflectometer which measures Fresnel reflection or Raleigh back-scattering light of an optical fiber or optical waveguide comprising:

a control means to perform distance correction according to a respective group refraction ratio of each period of the optical fibers or the optical waveguides, which are connected longitudinally and have known group refraction ratios $n_j$ to obtain a total distance $D_{total}$, where $$D_{\text{total}} = \sum_{j=1}^{m} \left(\frac{D_j}{n_j}\right),$$

where j is an index for the optical fibers and waveguides, $D_j$ is a measured distance for the optical fiber or waveguide corresponding to the index j, and m is a positive integer.

* * * * *